United States Patent
Tang

(10) Patent No.: US 9,483,868 B1
(45) Date of Patent: Nov. 1, 2016

(54) THREE-DIMENSIONAL VISUAL REPRESENTATIONS FOR MOBILE DEVICES

(71) Applicant: KABAM, INC., San Francisco, CA (US)

(72) Inventor: Wilson John Tang, Vancouver (CA)

(73) Assignee: Kabam, Inc., San Francisco, CA (US)

( * ) Notice: Subject to any disclaimer, the term of this patent is extended or adjusted under 35 U.S.C. 154(b) by 165 days.

(21) Appl. No.: 14/320,522

(22) Filed: Jun. 30, 2014

(51) Int. Cl.
*G06T 15/00* (2011.01)
*G06T 15/20* (2011.01)

(52) U.S. Cl.
CPC .................................. *G06T 15/205* (2013.01)

(58) Field of Classification Search
None
See application file for complete search history.

(56) References Cited

U.S. PATENT DOCUMENTS

| | | | | |
|---|---|---|---|---|
| 5,767,857 | A * | 6/1998 | Neely | G06T 17/00 345/427 |
| 8,581,905 | B2 | 11/2013 | Mitchell | 345/427 |
| 8,635,910 | B2 | 1/2014 | Cato | 73/548 |
| 2006/0170681 | A1* | 8/2006 | Ohba | G06T 15/04 345/426 |
| 2007/0139408 | A1* | 6/2007 | Keranen | G06T 15/50 345/426 |
| 2009/0313584 | A1 | 12/2009 | Kerr et al. | 715/849 |
| 2009/0325607 | A1 | 12/2009 | Conway et al. | 455/456.3 |
| 2012/0242664 | A1 | 9/2012 | Athans et al. | 345/426 |
| 2013/0002698 | A1* | 1/2013 | Geiger | G06T 15/00 345/589 |
| 2013/0249792 | A1 | 9/2013 | Carraro et al. | 345/156 |

OTHER PUBLICATIONS

Crabbe, "Hands-on with Seene: App puts 3D photos in the palm of your hand", Digital Photography Review, http://connect.dpreview.com/post/9779586590/hands-on-seene:smartphone-app-3d, published on Oct. 18, 2013, 4 pages.
Mosendz, "Here's What Amazon's 3D Smartphone Will Probably Look Like", http://www.thewire.com/technology/2014/04/what-amazons-3d-smartphone-will-probably-look-like/360744/, Apr. 16, 2014, 14 pages.
Simpson, "Using Mobile Accelerometers in Javascript and 3D Effects", http://www.inserthtml.com/2013/07/javascript-accelerometer/, Jul. 17, 2013, 25 pages.

* cited by examiner

*Primary Examiner* — William Beutel
(74) *Attorney, Agent, or Firm* — Sheppard Mullin Richter & Hampton LLP

(57) ABSTRACT

Rendering graphical objects to a display of a mobile client computing device by obtaining virtual object information, obtaining normal components of the virtual object, encoding an image file that describes the normal components of the virtual object, wherein encoding the image file includes encoding dimensional parameters of the normal components into color parameters held by the image file for individual image pixels so that the color information held by the image file describes the surfaces of the virtual object, determining a likely viewing angle of a user associated with the mobile client computing device, and modulating the color parameters in the image file describing the surfaces of the virtual object in response to an indication of a change of the orientation of the mobile client computing device.

24 Claims, 6 Drawing Sheets

THREE-DIMENSIONAL VISUAL REPRESENTATIONS FOR MOBILE DEVICES

FIELD OF THE DISCLOSURE

This disclosure relates to providing three-dimensional visual representations of objects on client computing platforms, and in particular, to providing three-dimensional visual representations of objects on mobile client computing platforms.

BACKGROUND

Systems exist where virtual worlds are provided to users. Virtual objects are provided in the virtual worlds. Presentations of the virtual objects are facilitated through client computing platforms. The presentation of virtual objects through client computing platforms are limited to the standard spectrum of colors in order to create visual interest in the virtual object.

Systems exist where a physical substrate is provided on a holographic image or diffraction grating image. This provides a prismatic lighting effect that is view-angle dependent. The two-dimensional image appears as a three-dimensional image upon a change of viewing angle.

SUMMARY

Traditional techniques for graphically representing a virtual object through client computing devices, and in particular mobile cline computing devices, are not capable of representing dynamic and view angle dependent effects similar to prismatic, iridescent, and holographic foil techniques.

One aspect of the disclosure relates to a method for rendering graphical objects. In some implementations the graphical objects are rendered to a display of a client computing device. The client computing device may be a mobile client computing device. The method may be performed using one or more physical computer processors. The physical computer processor(s) may be configured by machine-readable instructions to perform one or more operations.

The method may comprise obtaining virtual object information. The virtual object information may define multiple surfaces of a virtual object. The method may comprise obtaining normal components of the virtual object. The normal components of the virtual object may comprise unit vectors normal to the surfaces of the virtual object.

The method may comprise encoding an image file that describes the normal components of the virtual object. Encoding the image file may include encoding dimensional parameters of the normal components into color parameters held by the image file. The color parameters may include red, green, and blue color parameters. Encoding the image file may include encoding dimensional parameters of the normal components into color parameters held by the image file for individual image pixels. Using such operations, the color information held by the image file may describe the surfaces of the virtual object.

The method may comprise modifying the encoded image. For example, modifying the encoded image may include adding one or more repeatable patterns into the red, green and blue parameters of the image file to create a modified encoded image of the virtual object. The modified encoded image may comprise modified red, green, and blue parameters describing the modified surface of the virtual object. In some implementations, the one or more repeatable patterns comprise one or more of lines, concentric circles and/or other repeatable patterns.

The method may comprise determining a likely viewing angle of a user associated with the mobile client computing device. Determining the likely viewing angle may comprise obtaining motion information from one or more sensors on the mobile client computing device. The one or more sensors of the mobile client computing device may include an accelerometer. The one or more sensors of the mobile client computing device may include a camera. Obtaining a likely viewing angle may comprise obtaining an image through the camera. The mobile client computing device may comprise multiple cameras. The mobile client computing device may comprise a camera having a field of view likely to include the user associated with the mobile client computing device. The presence of at least a portion of the user may be determined to be present in the image captured by the camera. A likely viewing angle of the user associated with the client computing device may be determined based on the image captured by the camera. For example, the at least a portion of the user in the image may be used to determine the likely viewing angle of the user.

The method may comprise modulating the color parameters in the image file describing the surfaces of the virtual object in response to an indication of a change of the orientation of the mobile client computing device.

The method may comprise generating a visual representation of the virtual object for presentation on a display of the mobile client computing device, wherein such generation is based on the modulated color parameters in the image file that describe the surfaces of the virtual object so that the surfaces of the virtual object are modulated based on the likely viewing angle of a user associated with the mobile client computing device. In some implementations, the method may comprise modulating the modified red, green and blue parameters in response to an indication of a change of viewing angle of the user.

The method may comprise obtaining reflective view information of the virtual object. The reflective view information of the virtual object may describe the surfaces of a reflected image of the virtual object. The reflective view information of the virtual object may include reflected red, green and blue color parameters describing the surfaces of the reflected virtual object. To provide a three-dimensional effect, the reflected red, green and blue parameters of the virtual object may be modulated in response to the change in the view angle of the user determined by the mobile client computing device.

The reflective view information may be modified based on the encoded image file that describes the normal components of the virtual objects. Describing the normal components of the virtual object may comprise describing three strata, wherein each strata represents a dimension in three-dimensional space. Modifying the reflective view information may be performed such that the modifications simulate real world optical phenomena. The real world optical phenomena may comprise one or more of lenticular effects, holographic effects, anisotropic effects, and/or other optical effects.

Describing the surface of the reflected image of the virtual object may include modifying the reflected view information to include highly saturated colors and highlights.

The method may comprise applying shading to the surfaces of the virtual object based on the obtained normal components of the virtual object.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
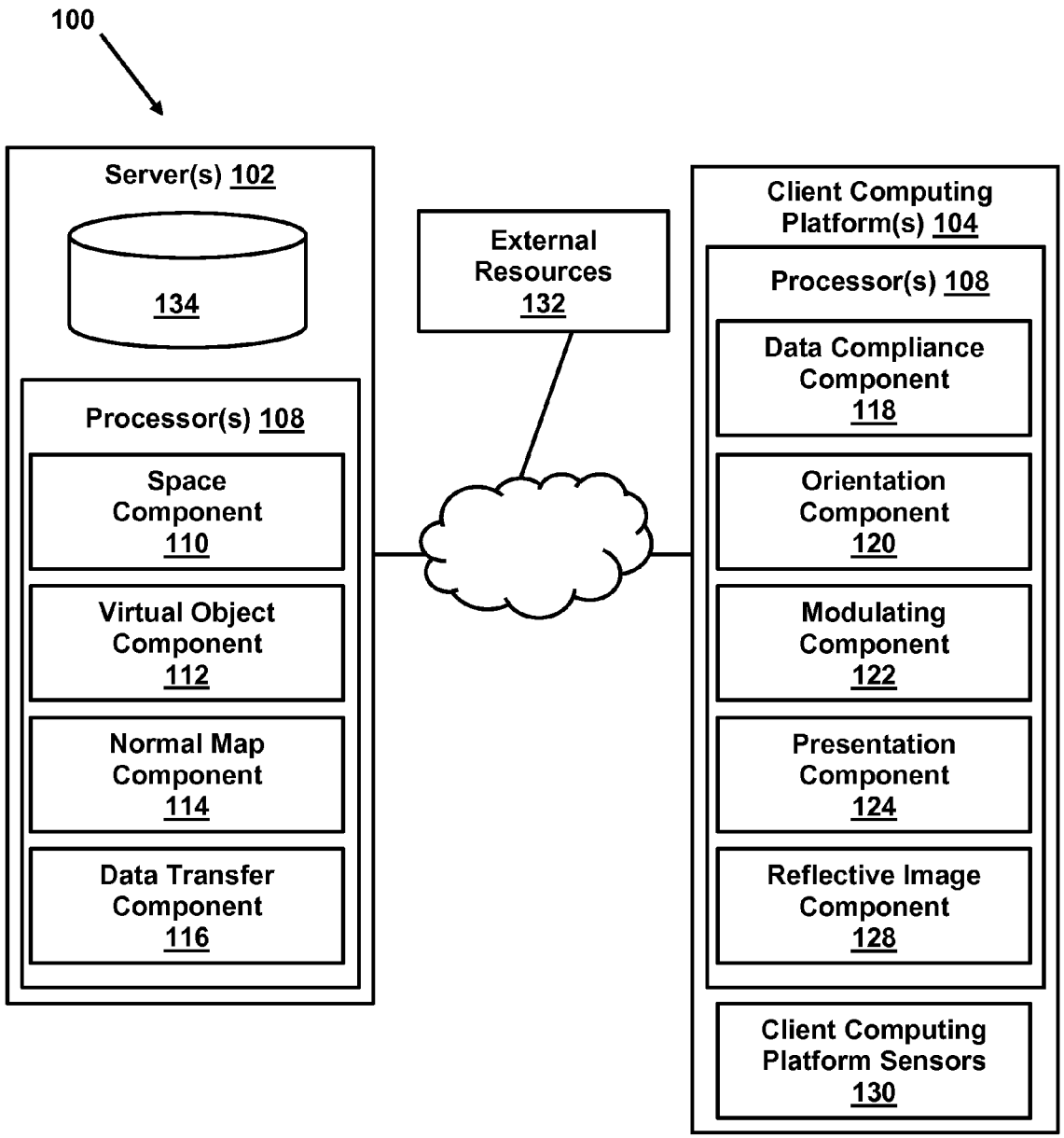
FIG. 1 illustrates a system for rendering graphical objects to a display of a mobile client computing device, in accordance with one or more implementations.

FIG. 1 illustrates a system 100 for rendering graphical objects to a display of a mobile client computing device. Facilitating the rendering of graphical objects to a display of a mobile client computing device may provide a virtual space in which the virtual objects are presented. The virtual space may be hosted over a network.

In some implementations, system 100 may include a server(s) 102. The server(s) 102 may be configured to communicate with one or more client computing platforms 104 according to a client/server architecture. The users may access system 100 and/or the virtual space via client computing platforms 104.

The server(s) 102 may be configured to execute one or more computer program components. The computer program components may include one or more of a virtual object component 112, normal map component 114, data transfer component 116, reflective image component 128, data compliance component 118, orientation component 120, modulating component 122, space component 110, reflective image component 128, and/or other components.

The server(s) 102, client computing platform(s) 120, and/or external resources 132 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 102, client computing platforms 104, and/or external resources 132 may be operatively linked via some other communication media.

A given client computing platform 104 may include one or more processors configured to execute computer program components. The computer program components may be configured to enable an expert or user associated with the given client computing platform 104 to interface with system 100 and/or external resources 132, and/or provide other functionality attributed herein to client computing platforms 104. By way of non-limiting example, the given client computing platform 104 may include one or more of a desktop computer, a laptop computer, a handheld computer, a tablet computing platform, a NetBook, a Smartphone, a gaming console, and/or other computing platforms. Mobile client computing platforms 104 may include one or more of a handheld computer, a tablet computing platform, a Smartphone and/or other computing platforms. Mobile client computing platforms 104 may include any client computing platform that is generally capable of being carried and/or moved by the user during use of the client computing platform 104.

The external resources 132 may include sources of information, hosts and/or providers of virtual environments outside of system 100, external entities participating with system 100, and/or other resources. In some implementations, some or all of the functionality attributed herein to external resources 132 may be provided by resources included in system 100.

The server 102 may include electronic storage 134, one or more processors 108, and/or other components. The server 102 may include communication lines, or ports, to enable the exchange of information with a network and/or other computing platforms. Illustration of server 102 in FIG. 1 is not intended to be limiting. The server 102 may include a plurality of hardware, software, and/or firmware components operating together to provide the functionality attributed herein to server 102. For example, server 102 may be implemented by a cloud of computing platforms operating together as server 102.

Electronic storage 134 may comprise electronic storage media that electronically stores information. The electronic storage media of electronic storage 134 may include one or both of system storage that is provided integrally (i.e., substantially non-removable) with server 102 and/or removable storage that is removably connectable to server 102 via, for example, a port (e.g., a USB port, a firewire port, etc.) or a drive (e.g., a disk drive, etc.). Electronic storage 134 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 134 may include one or more virtual storage resources (e.g., cloud storage, a virtual private network, and/or other virtual storage resources). Electronic storage 134 may store software algorithms, information determined by processor 108, information received from server 102, information received from client computing platforms 104, and/or other information that enables server 102 to function as described herein.

Processor(s) 108 is configured to provide information processing capabilities in server 102. As such, processor 108 may include one or more of a digital processor, an analog processor, a digital circuit designed to process information, an analog circuit designed to process information, a state machine, and/or other mechanisms for electronically processing information. Although processor 108 is shown in FIG. 1 as a single entity, this is for illustrative purposes only. In some implementations, processor 108 may include a plurality of processing units. These processing units may be physically located within the same device, or processor 108 may represent processing functionality of a plurality of devices operating in coordination. The processor 108 may be configured to execute components 110, 112, 114, 116, 118, 120, 122, 124, 128, 130, and/or other components. Processor 108 may be configured to execute components 110, 112, 114, 116, 118, 120, 122, 124, 128, 130, and/or other components by software; hardware; firmware; some combination of software, hardware, and/or firmware; and/or other mechanisms for configuring processing capabilities on processor 108.

It should be appreciated that although the processor(s) 108 are illustrated in FIG. 1 as being a single processing unit, processor(s) 108 may include includes multiple processing units. The multiple processing units may be located in the same device, separate devices, in server(s) 102, in client computing platforms 104, and/or other elements of the system 100. Some of the components 110, 112, 114, 116, 118, 120, 122, 124, 128, 130, and/or other components, may be located in server(s) 102, others in one or more of the client computing platforms 104, and/or other elements of the system. For, as shown in FIG. 1, space component 110, virtual object component 112, normal map component 114, data transfer component 116, and/or other components may be performed by processor(s) 108 in one or more servers 102. Data compliance component 118, orientation component 120, modulating component 122, and reflective image component 128 and/or other components may be performed by processor(s) 108 in one or more client computing platforms 104.

The description of the functionality provided by the different components 110, 112, 114, 116, 118, 120, 122, 124, 128, 130 described below is for illustrative purposes, and is not intended to be limiting, as any of components 110, 112, 114, 116, 118, 120, 122, 124, 128, 130 may provide more or less functionality than is described. For example, one or more of components 110, 112, 114, 116, 118, 120, 122, 124, 128, 130 may be eliminated, and some or all of its functionality may be provided by other ones of components 110, 112, 114, 116, 118, 120, 122, 124, 128, 130, and/or other components. As another example, processor 108 may be configured to execute one or more additional components that may perform some or all of the functionality attributed below to one of components 110, 112, 114, 116, 118, 120, 122, 124, 128, 130.

The space component 110 may be configured to implement the instance of the virtual space executed by the computer components to determine state of the virtual space. The state may then be communicated (e.g., via streaming visual data, via object/position data, and/or other state information) from server 102 to client computing platforms 104 for presentation to users. The state determined and transmitted to a given client computing platform 104 may correspond to a view for a user character being controlled by a user via the given client computing platform 104. The state determined and transmitted to a given client computing platform 104 may correspond to a location in the virtual space. The view described by the state for the given client computing platform may correspond, for example, to the location from which the view is taken, the location the view depicts, and/or other locations, a zoom ratio, a dimensionality of objects, a point-of-view, and/or view parameters of the view. One or more of the view parameters may be selectable by the user.

The instance of the virtual space may comprise a simulated space that is accessible by users via clients (e.g., client computing platforms 104) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer components may be synchronous, asynchronous, and/or semi-synchronous.

The above description of the manner in which the state of the virtual space is determined by space component 110 is not intended to be limiting. The space component 110 may be configured to express the virtual space in a more limited, or more rich, manner. For example, views determined for the virtual space representing the state of the instance of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by space component 110, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands input by the users through client computing platforms 104. The users may interact with each other through communications exchanged within the virtual space. Such communications may include one or more of textual chat, instant messages, private messages, voice communications, and/or other communications. Communications may be received and entered by the users via their respective client computing platforms 104. Communications may be routed to and from the appropriate users through server 102 (e.g., through space component 110).

As used herein, graphical object may include, but not be limited to, characters, objects, simulated physical phenomena (e.g., wind, rain, earthquakes, and/or other phenomena), and/or other elements within the virtual space. The graphical objects may be presented through client computing platforms 104 such as mobile client computing platforms.

The virtual object component 112 may be configured to obtain virtual object information. The virtual object information may define multiple surfaces of a virtual object. The virtual object information may include an indication of the color of the multiple surfaces of the virtual object. The multiple surfaces of the virtual object may comprise multiple polygons arranged in such a manner so as to describe the virtual object using multiple surfaces. For example, a cube may have a polygonal shape for each surface of the cube arranged to describe the surfaces of the cube. A sphere may have multiple polygonal shapes arranged to describe the surface of the sphere. The virtual object component 112 may be configured to obtain information related to the polygonal shapes that comprise the virtual object. The virtual object component may be configured to obtain virtual object information that defines vertices of the intersections of the polygonal shapes that comprise the virtual object. Such information may include the relative location of the vertices with respect to other vertices, polygonal shapes, and/or the virtual object itself.

Figure 2A:
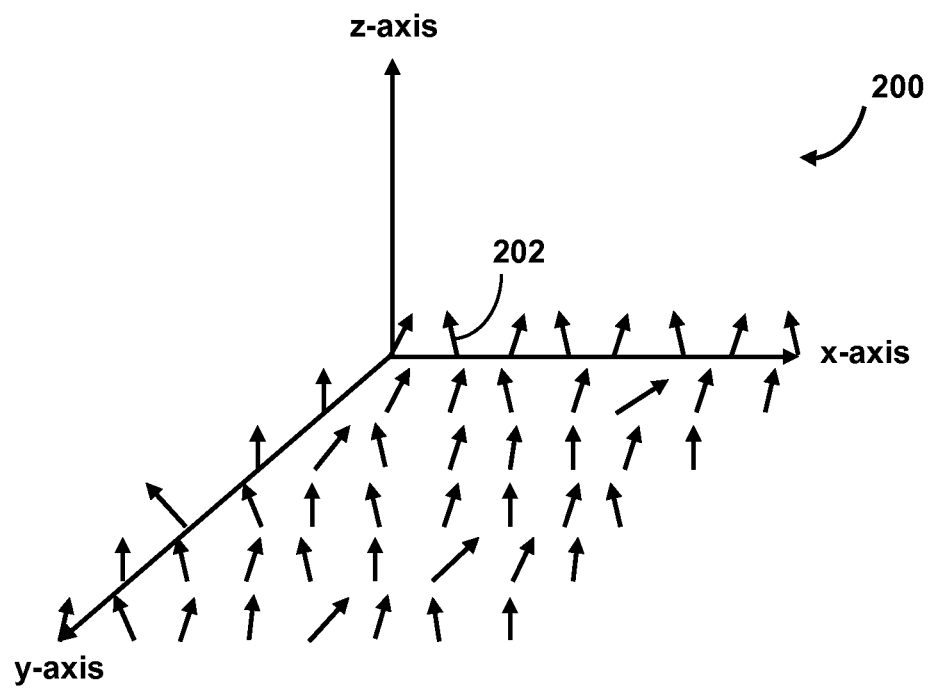
FIG. 2a schematically illustrates normal map components of the surface of a virtual object, in accordance with one or more implementations.

The normal map component 114 may be configured to obtain normal components of the virtual object. FIG. 2a schematically illustrates normal map components 200 of the surface of a virtual object, in accordance with one or more implementations. The normal components 200 of the virtual object may comprise unit vectors 202 normal to the surfaces of the virtual object.

With reference to FIG. 1, the normal map component 114 may be configured to encode an image file that describes the normal components of the virtual object. Encoding the image file may include encoding dimensional parameters of the normal components into color parameters held by the image file. The color parameters may include red, green, and blue color parameters. Encoding the image file may include encoding dimensional parameters of the normal components into color parameters held by the image file for individual image pixels. The red, green, and blue color parameters may be represented by the x, y and z dimensions of the unit vectors 202, as shown in FIG. 2a. Using such operations, the color information held by the image file may describe the normal surfaces of the virtual object.

Figure 2B:
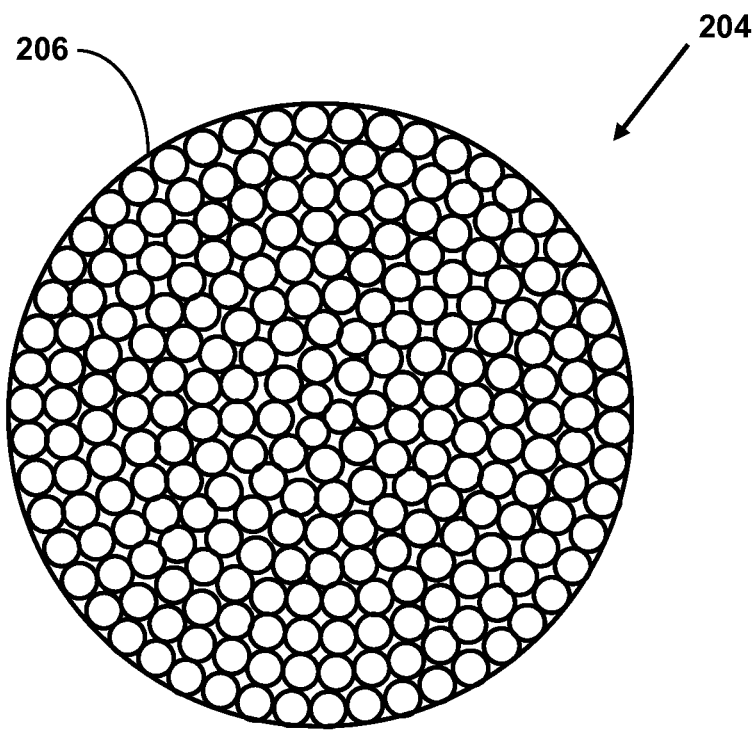
FIG. 2b schematically illustrates repeatable patterns in the normal map of the virtual object, in accordance with one or more implementations.

The normal map component 114 may be configured to modify the encoded image. For example, modifying the encoded image may include adding one or more repeatable patterns into the red, green and blue parameters of the image file to create a modified encoded image of the virtual object. Applying repeatable patterns into the red, green, and blue parameters of the image file may include modifying the unit vectors of the normal map components. The modified encoded image may comprise modified red, green, and blue parameters describing the modified surface of the virtual object. With reference to FIG. 2b, in some implementations, the one or more repeatable patterns 204 may comprise one or more of lines, concentric circles and/or other repeatable patterns.

The normal map component 114 may be configured to apply shading to the surfaces of the virtual object based on the obtained normal components of the virtual object.

The normal map component 114 may be configured to create three different strata within the normal map. Individual ones of the strata may correspond to a dimension in three-dimensional space. Individual ones of the strata may be modified by the normal map component 114 with one or more repeatable patterns.

The data transfer component 116 may be configured to facilitate the communication of the image file between the server(s) 102 and the client computing platforms 104. The data transfer component 116 may be configured to facilitate the transfer of the image file from the server(s) 102 to the client computing platforms 104. The image file may be communicated to the client computing platforms 104 at a time prior to the virtual object described by the image file being presented to the user through the client computing platform 104.

The data transfer component 116 may be configured to determine the version of the image file stored on the client computing platform(s) 104. In response to determining that the version of the image file describing the virtual object on the client computing platform 104 is older than the version available to the server(s) 102, the data transfer component 116 may be configured to facilitate the transfer of the image file to the client computing platform 104 to replace the older version.

The data compliance component 118 may be configured to determine the authenticity of the image file being transferred between the server(s) and the client computing platform 104. The data compliance component 118 may be configured to determine the quality of the image file being transferred between the server(s) and the client computing platform 104. The data compliance component 118 may be configured to assign a quality index to the image file being transferred. In response to an indication that the image file has a quality index below a threshold, the data compliance component 118 may be configured to provide an indication to the server(s) 102 that the image file has a quality index below the threshold. In response to receiving the indication that the image file transferred to the client computing platform 104 has a quality index below the threshold, the data transfer component 116 may be configured to re-transmit the image file to the client computing platform 104.

The orientation component 120 may be configured to determine a likely viewing angle of a user associated with the client computing platform 104. The orientation component 120 may be configured to determine the likely viewing angle by obtaining motion information from one or more client computing platform sensors 130 on the mobile client computing device 300. The one or more client computing platform sensors 130 of the mobile client computing platform 104 may include an accelerometer. The one or more sensors of the mobile client computing platform 104 may include a camera. Obtaining a likely viewing angle may comprise obtaining an image through the camera. The mobile client computing device 300 may comprise multiple cameras. The mobile client computing device 300 may comprise a camera having a field of view likely to include the user associated with the mobile client computing device 300. The presence of at least a portion of the user may be determined to be present in the image captured by the camera. A likely viewing angle of the user associated with the client computing device 300 may be determined based on the image captured by the camera. For example, at least a portion of the user in the image may be used to determine the likely viewing angle of the user.

The modulating component 122 may be configured to modulate the color parameters in the image file describing the surfaces of the virtual object in response to an indication of a change of the orientation of the mobile client computing device 300, by the orientation component 120.

The modulating component 122 may be configured to apply surface shades and/or modulate the surface shades of the normal map and/or encoded image file in response to the determination of the change in orientation of the mobile client computing device 300. The modulating component 122 may be configured to apply and/or modulate the surface shades in real time or in near real time in response to an indication that the orientation of the mobile client computing device 300 has changed.

The normal maps obtained and/or determined by the normal map component 114 may be used to facilitate the distortion of the encoded image files that describe the virtual object. The normal maps obtained and/or determined by the normal map component 114 may be used to facilitate the distortion of the reflected image for the virtual object. The distortion of the encoded image files that describe the virtual object may provide the appearance of real-world visual effects.

Figure 3:
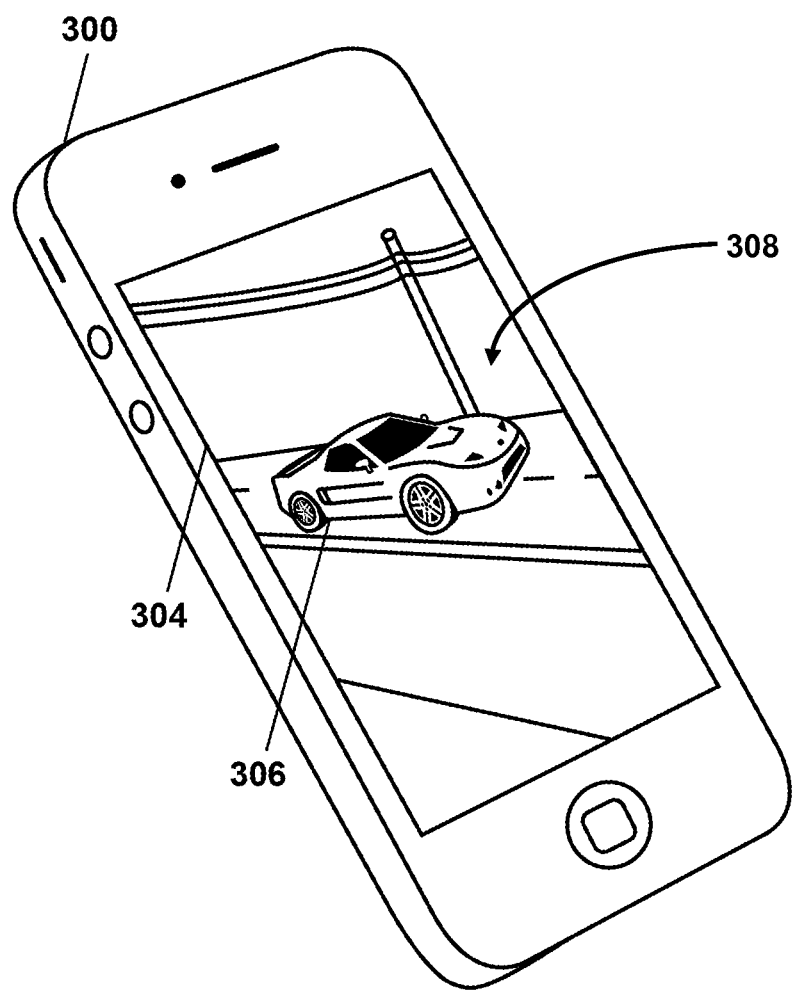
FIG. 3 illustrates a mobile client computing device presenting a rendered graphical object, in accordance with one or more implementations; and, FIG. 4 illustrates a method for rendering graphical objects to a display of a mobile client computing device, in accordance with one or more implementations.

With reference to FIGS. 1 and 3, the presentation component 124 may be configured to generate a visual representation of the virtual object 306 for presentation on a display 304 of the mobile client computing device 300. The generated visual representation of the virtual object 306 may be based on the modulated color parameters in the image file that describe the surfaces of the virtual object 306 so that the surfaces of the virtual object 306 are modulated based on the likely viewing angle of a user associated with the mobile client computing device 300. The virtual object 306 may be presented to the user in a virtual space with one or more other virtual objects. The one or more other virtual objects may have been modified and/or modulated in a similar manner as the virtual object 306.

In some implementations, modulating the modified red, green and blue parameters may be performed in response to an indication of a change of viewing angle of the user.

The reflective image component may be configured to obtain reflective view information for the virtual object. The reflective view information for the virtual object may describe the surfaces of a reflected image on the virtual object. For example, where the virtual object is a vehicle, such as that shown in FIG. 3, the virtual object 306 may reflect the reflected image of other objects within the virtual space. The reflective view information of the virtual object may include reflected red, green and blue color parameters describing the reflected images of the reflected virtual objects. To provide a three-dimensional effect, the reflected red, green and blue parameters of the virtual object may be modulated in response to the change in the view angle of the user determined by the mobile client computing device.

Describing the surface of the reflected image for the virtual object may include modifying the reflected view information to include highly saturated colors and highlights.

The reflective view information may be modified based on the encoded image file that describes the normal components of the virtual objects. Describing the normal components of the virtual object may comprise describing three strata, wherein each strata represents a dimension in three-dimensional space. Modifying the reflective view information may be performed such that the modifications simulate real world optical phenomena. Modulating the image file may be performed such that the modifications simulate real world optical phenomena. The real world optical phenomena may comprise one or more of lenticular effects, holographic effects, anisotropic effects, and/or other optical effects.

Figure 4:
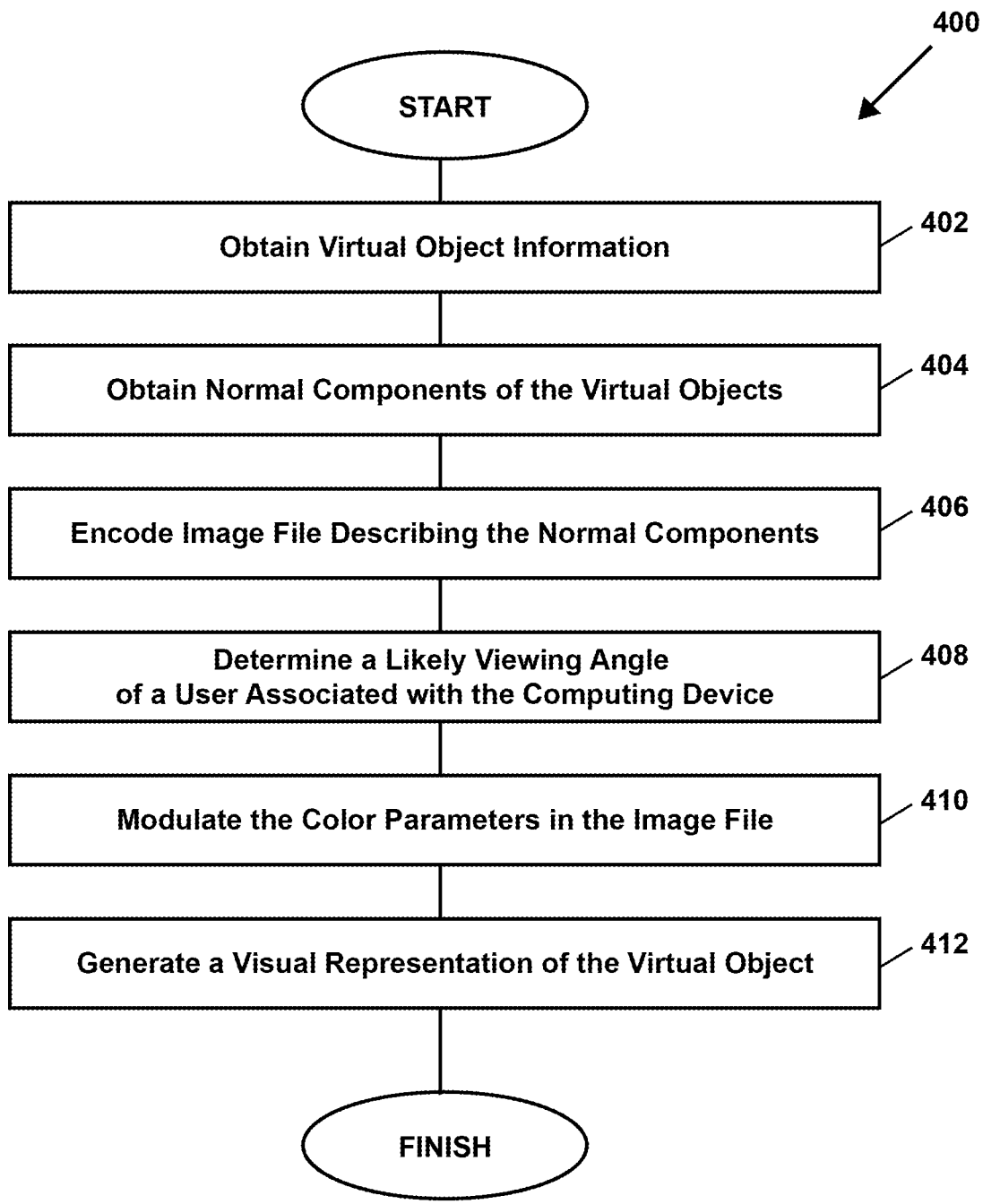

FIG. 4 illustrates a method 400 of hosting a virtual space to client computing devices for interaction by users. The operations of method 400 presented below are intended to be illustrative. In some embodiments, method 400 may be accomplished with one or more additional operations not described, and/or without one or more of the operations discussed. Additionally, the order in which the operations of method 400 are illustrated in FIG. 4 and described below is not intended to be limiting.

In some embodiments, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

At an operation 402, virtual object information may be obtained. The virtual object information may define multiple surfaces of a virtual object. The functions performed at the operation 402 may be performed by a virtual object component, such as virtual object component 112, in accordance with one or more implementations.

At an operation 404, normal components of the virtual object may be obtained. The normal components of the virtual object may comprise unit vectors normal to the surfaces of the virtual object. The functions performed at the operation 404 may be performed by a normal map component, such as normal map component 114, in accordance with one or more implementations.

At an operation 406, an image file may be encoded that describes the normal components of the virtual object. Encoding the image file may include encoding dimensional parameters of the normal components into color parameters held by the image file. The color parameters may include red, green, and blue color parameters. Encoding the image file may include encoding dimensional parameters of the normal components into color parameters held by the image file for individual image pixels. Using such operations, the color information held by the image file may describe the surfaces of the virtual object. The functions performed at the operation 406 may be performed by a normal map component, such as normal map component 114, in accordance with one or more implementations.

At an operation 408, a likely viewing angle of a user associated with the mobile client computing device may be determined. Determining the likely viewing angle may comprise obtaining motion information from one or more sensors on the mobile client computing device. The one or more sensors of the mobile client computing device may include an accelerometer. The one or more sensors of the mobile client computing device may include a camera. Obtaining a likely viewing angle may comprise obtaining an image through the camera. The mobile client computing device may comprise multiple cameras. The mobile client computing device may comprise a camera having a field of view likely to include the user associated with the mobile client computing device. The presence of at least a portion of the user may be determined to be present in the image captured by the camera. A likely viewing angle of the user associated with the client computing device may be determined based on the image captured by the camera. For example, the at least a portion of the user in the image may be used to determine the likely viewing angle of the user. The functions performed at the operation 408 may be performed by an orientation component, such as orientation component 120, in accordance with one or more implementations.

At an operation 410, the color parameters in the image file describing the surfaces of the virtual object may be modulated in response to an indication of a change of the orientation of the mobile client computing device. The functions performed at the operation 410 may be performed by an modulating component, such as modulating component 122, in accordance with one or more implementations.

At an operation 412, a visual representation of the virtual object may be generated for presentation on a display of the mobile client computing device. The representation of the virtual object may be based on the modulated color parameters in the image file that describe the surfaces of the virtual object so that the surfaces of the virtual object are modulated based on the likely viewing angle of a user associated with the mobile client computing device. In some implementations, the method may comprise modulating the modified red, green and blue parameters in response to an indication of a change of viewing angle of the user. The functions performed at the operation 412 may be performed by presentation component, such as presentation component 124, in accordance with one or more implementations.

Figure 5:
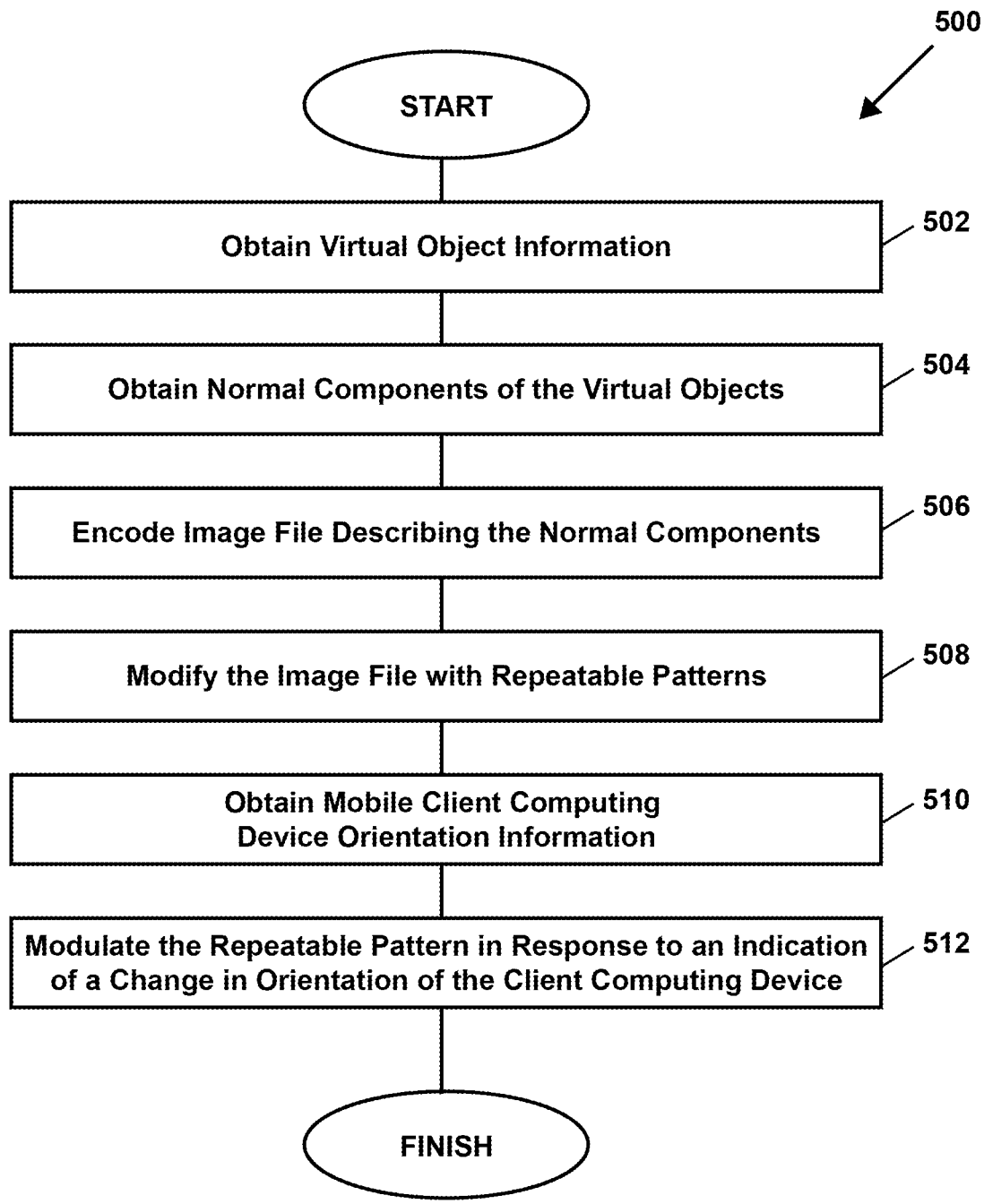
FIG. 5 illustrates a method for rendering graphical objects to a display of a mobile client computing device, in accordance with one or more implementations.

FIG. 5 illustrates a method 500 of hosting a virtual space to client computing devices for interaction by users. The operations of method 500 presented below are intended to be illustrative. In some embodiments, method 500 may be accomplished with one or more additional operations not described, and/or without one or more of the operations discussed. Additionally, the order in which the operations of method 500 are illustrated in FIG. 5 and described below is not intended to be limiting.

In some embodiments, method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

At an operation 502, virtual object information may be obtained. The virtual object information may define multiple surfaces of a virtual object. The functions performed at the operation 502 may be performed by a virtual object component, such as virtual object component 112, in accordance with one or more implementations.

At an operation 504, normal components of the virtual object may be obtained. The normal components of the virtual object may comprise unit vectors normal to the surfaces of the virtual object. The functions performed at the operation 504 may be performed by a normal map component, such as normal map component 114, in accordance with one or more implementations.

At an operation 506, an image file may be encoded that describes the normal components of the virtual object. Encoding the image file may include encoding dimensional parameters of the normal components into color parameters held by the image file. The color parameters may include red, green, and blue color parameters. Encoding the image file may include encoding dimensional parameters of the normal components into color parameters held by the image file for individual image pixels. Using such operations, the color information held by the image file may describe the surfaces of the virtual object. The functions performed at the operation 506 may be performed by a normal map component, such as normal map component 114, in accordance with one or more implementations.

At an operation 508, the encoded image may be modified. For example, modifying the encoded image may include adding one or more repeatable patterns into the red, green and blue parameters of the image file to create a modified encoded image of the virtual object. The modified encoded image may comprise modified red, green, and blue parameters describing the modified surface of the virtual object. In some implementations, the one or more repeatable patterns comprise one or more of lines, concentric circles and/or other repeatable patterns. The functions performed at the operation 508 may be performed by a normal map component, such as normal map component 114, in accordance with one or more implementations.

At an operation 510, a likely viewing angle of a user associated with the mobile client computing device may be determined. Determining the likely viewing angle may comprise obtaining motion information from one or more sensors on the mobile client computing device. The one or more sensors of the mobile client computing device may include an accelerometer. The one or more sensors of the mobile client computing device may include a camera. Obtaining a likely viewing angle may comprise obtaining an image through the camera. The mobile client computing device may comprise multiple cameras. The mobile client computing device may comprise a camera having a field of view likely to include the user associated with the mobile client computing device. The presence of at least a portion of the user may be determined to be present in the image captured by the camera. A likely viewing angle of the user associated with the client computing device may be determined based on the image captured by the camera. For example, the at least a portion of the user in the image may be used to determine the likely viewing angle of the user. The functions performed at the operation 510 may be performed by an orientation component, such as orientation component 120, in accordance with one or more implementations.

At an operation 512 the repeatable patterns may be modulated in response to an indication of a change in orientation of the client computing device determined at an operation 508. The functions performed at the operation 512 may be performed by modulating component, such as modulating component 122, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A method for rendering graphical objects to a display of a mobile client computing device, the method to be performed using one or more physical computer processors configured by machine-readable instructions to perform one or more operations, the method comprising:

obtaining virtual object information, wherein virtual object information defines multiple surfaces of a virtual object;

obtaining information defining normal vectors of surfaces of the virtual object, wherein the normal vectors of the virtual object are unit vectors normal to the surfaces of the virtual object;

encoding an image file having an image file format that describes the normal of the surfaces of the virtual object, wherein encoding the image file includes encoding vector coordinates of the normal vectors into color parameters in the image file format of the image file for individual image pixels so that the color information held by the image file describes the surfaces of the virtual object;

determining a likely viewing angle of a user associated with the mobile client computing device;

modulating the color parameters in the image file describing the surfaces of the virtual object in response to an indication of a change of orientation of the mobile client computing device, wherein modulation of the color parameters results in relative changes in orientation of the normal vectors with respect to each other; and generating a visual representation of the virtual object for presentation on a display of the mobile client computing device, wherein such generation is based on the modulated color parameters in the image file that describe the surfaces of the virtual object so that the orientations of the surfaces of the virtual object relative to each other are modulated based on the likely viewing angle of a user associated with the mobile client computing device.

2. The method of claim 1, wherein the color parameters include red, green and blue color parameters, further comprising:

modifying the encoded image, such that modifying the encoded image includes adding one or more repeatable patterns into the red, green and blue parameters to create a modified encoded image of the virtual object, wherein the modified encoded image comprises modified red, green, and blue parameters describing the modified surface of the virtual object; and, modulating the modified red, green and blue parameters in response to an indication of a change of viewing angle of the user.

3. The method of claim 2, wherein the one or more repeatable patterns comprise one or more of lines and/or concentric circles.

4. The method of claim 1, further comprising:

obtaining reflective view information of the virtual object, wherein the reflective view information of the virtual object describes the surfaces of a reflected image of the virtual object and includes reflected red, green and blue color parameters describing the surfaces of the reflected virtual object; and, modulating the reflected red, green and blue parameters of the virtual object information in response to a change in a view angle of the user.

5. The method of claim 4, further comprising modifying the reflective view information based on the encoded image file that describes the normal of the surfaces of the virtual objects.

6. The method of claim 5, wherein modifying the reflective view information is configured to simulate real world optical phenomena.

7. The method of claim 6, wherein the real world optical phenomena comprise of lenticular effects, holographic effects, and/or anisotropic effects.

8. The method of claim 1, further comprising:

applying shading to the surfaces of the virtual object based on the obtained information defining the normal vectors of surfaces of the virtual object.

9. The method of claim 1, wherein determining the likely viewing angle comprises obtaining motion information from one or more sensors on the client computing device.

10. The method of claim 9, wherein the one or more sensors includes an accelerometer.

11. The method of claim 9, wherein the one or more sensors includes a camera and the method further comprising:

obtaining an image through the camera;

determining the presence of at least a portion of the user, associated with the client computing device, being present in the image; and, determining a likely viewing angle of the user associated with the client computing device, wherein the at least a portion of the user in the image is used to determine the likely viewing angle of the user.

12. The method of claim 1, wherein describing the normal of the surfaces of the virtual object comprises describing three strata, wherein each strata represents a dimension in three-dimensional space.

13. A system for rendering graphical objects to a display of a mobile client computing device, the system comprising:

one or more physical computer processors configured by machine readable instructions to:

obtain virtual object information, wherein virtual object information defines multiple surfaces of a virtual object;

obtain information defining normal vectors of surfaces of the virtual object, wherein the normal vectors of the virtual object are unit vectors normal to the surfaces of the virtual object;

encode an image file having an image file format that describes the normal of the surfaces of the virtual object, wherein encoding the image file includes encoding vector coordinates of the normal vectors into color parameters in the image file format of the image file for individual image pixels so that the color information held by the image file describes the surfaces of the virtual object;

determine a likely viewing angle of a user associated with the mobile client computing device;

modulate the color parameters in the image file describing the surfaces of the virtual object in response to an indication of a change of orientation of the mobile client computing device, wherein modulation of the color parameters results in relative changes in orientation of the normal vectors with respect to each other; and generate a visual representation of the virtual object for presentation on a display of the mobile client computing device, wherein such generation is based on the modulated color parameters in the image file that describe the surfaces of the virtual object so that the orientations of the surfaces of the virtual object relative to each other are modulated based on the likely viewing angle of a user associated with the mobile client computing device.

14. The system of claim 13, wherein the color parameters include red, green and blue color parameters, and wherein the one or more processors are further configured by machine-readable instructions to:
 modify the encoded image, such that modifying the encoded image includes adding one or more repeatable patterns into the red, green and blue parameters to create a modified encoded image of the virtual object, wherein the modified encoded image comprises modified red, green, and blue parameters describing the modified surface of the virtual object; and,
 modulate the modified red, green and blue parameters in response to an indication of a change of viewing angle of the user.

15. The system of claim 14, wherein the one or more repeatable patterns comprise one or more of lines and/or concentric circles.

16. The system of claim 13, wherein the one or more processors are further configured by machine-readable instructions to:
 obtain reflective view information for the virtual object, wherein the reflective view information of the virtual object describes the surfaces of a reflection on the virtual object and includes reflected red, green and blue color parameters describing the surfaces of the virtual object showing the reflection; and,
 modulate the reflected red, green and blue parameters of the virtual object information in response to a change in a view angle of the user.

17. The system of claim 16, wherein the one or more processors are further configured by machine-readable instructions to
 modify the reflective view information based on the encoded image file that describes the normal of the surfaces of the virtual objects.

18. The system of claim 17, wherein modifying the reflective view information is configured to simulate real world optical phenomena.

19. The system of claim 18, wherein the real world optical phenomena comprise of lenticular effects, holographic effects, and/or anisotropic effects.

20. The system of claim 13, wherein the one or more processors are further configured by machine-readable instructions to:
 apply shading to the surfaces of the virtual object based on the obtained information defining the normal vectors of surfaces of the virtual object.

21. The system of claim 13, wherein determining the likely viewing angle comprises obtaining motion information from one or more sensors on the client computing device.

22. The system of claim 21, wherein the one or more sensors includes an accelerometer.

23. The system of claim 21, wherein the one or more sensors includes a camera and the one or more processors are further configured by machine-readable instructions to:
 obtain an image through the camera;
 determine the presence of at least a portion of the user, associated with the client computing device, being present in the image; and,
 determine a likely viewing angle of the user associated with the client computing device, wherein the at least a portion of the user in the image is used to determine the likely viewing angle of the user.

24. The system of claim 13, wherein describing the normal of the surfaces of the virtual object comprises describing three strata, wherein each strata represents a dimension in three-dimensional space.

* * * * *